(12) United States Patent
Sahu et al.

(10) Patent No.: US 7,941,425 B2
(45) Date of Patent: May 10, 2011

(54) TECHNIQUES FOR SCORING AND COMPARING QUERY EXECUTION PLANS

(75) Inventors: Birendra Kumar Sahu, Trimulgherry Secunderabad (IN); Deva Raju Kvm, Sainikpuri Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 520 days.

(21) Appl. No.: 11/782,824

(22) Filed: Jul. 25, 2007

(65) Prior Publication Data

US 2009/0030888 A1 Jan. 29, 2009

(51) Int. Cl.
G06F 7/00 (2006.01)
G06F 17/30 (2006.01)

(52) U.S. Cl. .................................. 707/718; 707/719
(58) Field of Classification Search .................. 707/705, 707/713, 714, 718, 719
See application file for complete search history.

(56) References Cited

U.S. PATENT DOCUMENTS

| | | | | |
|---|---|---|---|---|
| 5,337,258 A * | 8/1994 | Dennis | | 714/47 |
| 5,765,149 A * | 6/1998 | Burrows | | 707/5 |
| 5,943,666 A * | 8/1999 | Kleewein et al. | | 707/2 |
| 6,009,265 A * | 12/1999 | Huang et al. | | 707/3 |
| 6,026,391 A * | 2/2000 | Osborn et al. | | 707/2 |
| 6,175,836 B1 | 1/2001 | Aldred | | |
| 6,330,552 B1 * | 12/2001 | Farrar et al. | | 705/400 |
| 6,363,371 B1 * | 3/2002 | Chaudhuri et al. | | 707/2 |
| 6,738,756 B1 * | 5/2004 | Brown et al. | | 707/2 |
| 6,938,035 B2 * | 8/2005 | Driesch et al. | | 707/3 |
| 6,996,556 B2 * | 2/2006 | Boger et al. | | 707/3 |
| 7,080,062 B1 | 7/2006 | Leung et al. | | |
| 7,146,365 B2 | 12/2006 | Allen et al. | | |
| 7,272,597 B2 * | 9/2007 | Chowdhury et al. | | 707/3 |
| 7,464,084 B2 * | 12/2008 | Huang et al. | | 707/4 |
| 2003/0093408 A1 * | 5/2003 | Brown et al. | | 707/2 |
| 2004/0267719 A1 | 12/2004 | Doherty et al. | | |
| 2006/0026116 A1 | 2/2006 | Day et al. | | |
| 2006/0080285 A1 * | 4/2006 | Chowdhuri | | 707/3 |
| 2006/0136396 A1 | 6/2006 | Brobst | | |
| 2007/0050328 A1 * | 3/2007 | Li et al. | | 707/2 |
| 2007/0162425 A1 * | 7/2007 | Betawadkar-Norwood et al. | | 707/2 |

* cited by examiner

*Primary Examiner* — James Trujillo
*Assistant Examiner* — Marc Somers
(74) *Attorney, Agent, or Firm* — Schwegman, Lundberg & Woessner (57) ABSTRACT

Techniques for scoring and comparing query execution plans are provided. Predefined parameter types are identified in query execution plans and predefined weighted values are assigned to any identified parameters within the query execution plans. The weights are summed on a per processing step bases and the sum of the processing steps represents a total score for a particular query execution plan. The total scores or individual step scores from different query execution plans can then be compared or evaluated against one another for optimization and problem detection analysis.

16 Claims, 3 Drawing Sheets

TECHNIQUES FOR SCORING AND COMPARING QUERY EXECUTION PLANS

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright © 2007, NCR Corp. of Dayton, Ohio—All Rights Reserved.

FIELD

The invention relates generally to database processing and more particularly to techniques for scoring and comparing query execution plans.

BACKGROUND

Enterprises are increasingly capturing, storing, and mining a plethora of information related to communications with their customers and related to their day-to-day internal operations. Often this information is stored and indexed within databases. Once the information is indexed, queries are developed on an as-needed basis to mine the information from the database for a variety of organizational goals, such as marketing, planning, reporting, etc.

In fact, the size of the databases can be daunting and each database can include many terabytes of information. To deal with this, an enterprise deploys a variety of hardware resources: storage devices, processing devices, network devices, etc. In addition, a variety of software resources are needed to optimally utilize the hardware resources associated with databases. Still further a plethora of expensive and skilled support and development staff is needed to maintain the databases and keep them operational.

One solution to address the software resources, and which has a significant bearing on the hardware and human resources, is to implement query execution plans that are tested or automatically evaluated before any particular query is executed against a database. This permits queries to be somewhat optimized and also permits glaring problems to be detected before the queries execute against the database. Query performance can be a major issue, such as when a particular query takes several hours to process against the database and consumes a large amount of processing resources during execution.

However, sometimes a particular query may run against different versions of a database or against different databases entirely. The problem can be even more complex when multiple queries run against multiple databases. When these situations occur, the database administrator may want to compare multiple query plans against one another to select optimal ones or to determine potential bottlenecks in advance of any real execution. Such comparisons are often manual and even with semi automated tools the comparisons can be very difficult to efficiently examine.

Thus, improved mechanisms for scoring and comparing query execution plans are desirable.

SUMMARY

In various embodiments, techniques for scoring and comparing query execution plans are presented. According to an embodiment, predefined parameter types are acquired for comparing multiple query execution plans against one another. Each query execution plan includes a number of parameters associated with the parameter types and each parameter is identified and acquired for comparison from each query execution plan. Next, predefined weights are assigned to each of the parameters that are identified within each of the query execution plans. Finally, a total score is computed for each of the query execution plans with reference to the weights that are associated with the parameters of query execution plan.

DETAILED DESCRIPTION

Figure 1:
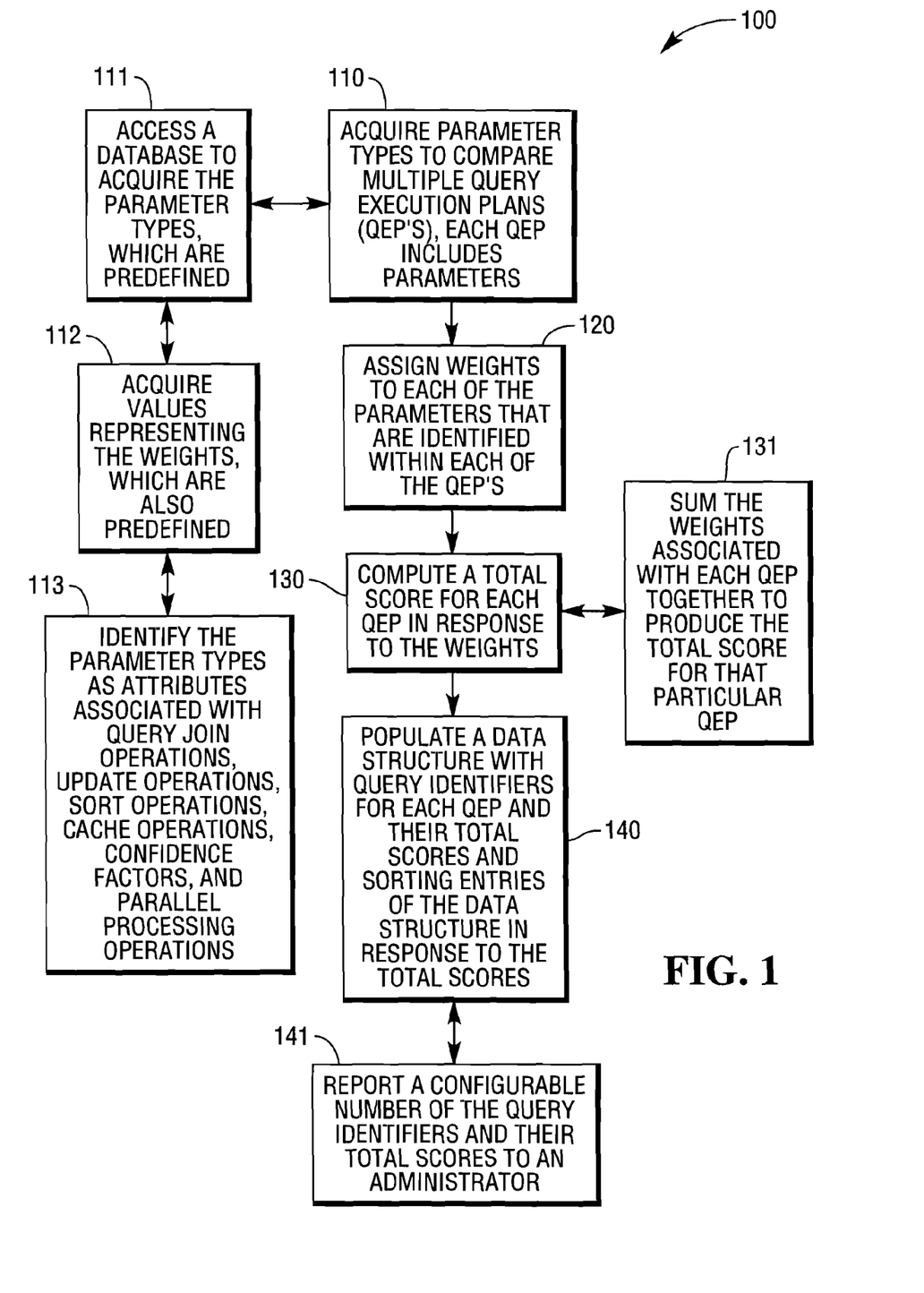
FIG. 1 is a diagram of a method for scoring and comparing query execution plans, according to an example embodiment.

FIG. 1 is a diagram of a method 100 for scoring and comparing query execution plans, according to an example embodiment. The method 100 (herein after referred to as "query scoring service") is implemented in machine-accessible or computer-readable media as instructions and is executed by one or more machines (processing devices). Moreover, the query scoring service is accessible over a network. The network may be wired, wireless, or a combination of wired and wireless.

As used herein a "database optimize" is used to develop query execution plans for queries that are to be executed against a database. Any database optimizer may be used and as described more completely herein and below multiple database optimizers or multiple different versions of a same database optimizer may be used to produce query execution plans. Each different version of the database optimizer may result in different versions of a same query execution plan.

A "query execution plan" is a set of processing steps to perform a given query in an optimal manner against a given database. Queries are parsed by a database optimizer to produce the query execution plans. Again, multiple different database optimizers or different versions of a same database optimizer can and often does produce multiple different query execution plans.

The techniques presented herein and below permit query execution plans developed by multiple different database optimizers or by multiple different versions of the same database optimizer to be scored and then compared for purposes of optimally selecting a particular database optimizer or particular query execution plan developed by a particular database optimizer. Additionally, the techniques presented herein permit thousands of query execution plans to be scored and then sorted for rapid comparison.

It is within this initial context that the processing associated with the query scoring service is now discussed in detail.

At 110, the query scoring service acquires parameter types to compare multiple query execution plans. Each query execution plan includes parameters and values for those parameters. The parameter types are associated with particular parameter and value pairs. Examples of particular parameter types are described in more detail below.

In an embodiment, at 111, the query scoring service acquires the parameter types. At 112, each of the parameter types are also associated with weighted values. The parameter types and the values for the weights are predefined and accessible to the query scoring service.

At 113, the query scoring service identifies and recognizes the parameter types as a variety of different information, such as but not limited to attributes associated with query join operations, update operations, sort operations, cache operations, confidence factors, and parallel processing operations. Some sample pseudo code for an example definition of some of these parameter types and others are presented below in an example implementation and they are described in greater detail below with that example implementation.

At 120, the query scoring service assigns weights to each of the parameters that are identified in each of the query execution plans. Again, these weights are associated with values that are predefined and associated with specific parameter types. Some example weighted values are discussed below with the sample implementation.

At 130, the query scoring service computes a total score for each of the query execution plans in response to the weights. For example, suppose that four specific parameters were found in a given execution plan having weights of 1, 2, 3, and 4; the total score, in one embodiment, may be computed as 1+2+3+4=10. Thus, in an embodiment, at 131, the query scoring service may sum the weights associated with each query execution plan together to produce the total score for the particular query execution plan being scored. More detail on computing the total score for a query execution plan is presented below with the example implementation.

According to an embodiment, at 140, the query scoring service populates a data structure with query identifiers; and with each query identifier, the difference of its total score for each plan that was computed at 130. Each entry includes a specific query identifier representing a specific query execution plan along with the corresponding computed score difference for the query execution plans produced by two different database optimizers.

Also, at 140, the query scoring service may sort the entries of the data structure in response to the values associated with the score difference. The entries of the data structure may be sorted in ascending order with the first entry being indicative of the execution plan having the most significant change across two databases/database optimizers.

In another case, at 141, the query scoring service reports a configurable number of the query identifiers and their corresponding score difference to an administrator for further evaluation and inspection. So, the top N entries can be reported where N is an integer greater than 0 and may have been preconfigured or dynamically supplied as a processing parameter by an administrator. Reports may be put in any desired format or embedded within emails or instant messages.

It is now understood, how a plurality of processing parameters may be predefined and utilized with weights to efficiently score and then compare a plurality of query execution plans in efficient and automated manners. A sample implementation is now provided for ease of comprehension. However, it is to be understood that other implementations are foreseeable and such other implementations are intended to fall within the teachings presented herein.

Consider a sample implementation of the parameters, weights, and the processing associated with the query scoring service. Initially, a variety of different parameters that influence behaviors of database optimizers are identified and defined. These may include such things as determining that if a database join operation is being used in a query execution plan then a comparison is used to determine the type of join operation, such as a nested join, a merge join, a product join, etc.

Additionally, the query execution plan may include operations to retrieve or process data using single or multiple data Access Module Processors (AMP's). So, a determination is made from the query execution plan to determine if a single AMP is being used, AMP's, a group of cooperating AMP's, or even all available AMP's. This has bearing on the efficiency of retrieving and processing information associated with the query execution plan so determining these types or parameters is beneficial.

Still further, the attributes of a database relation that is to be retrieved for the query can impact the performance of the query execution plan. Thus, a determination is made from the query execution plan to determine if the retrieved relation, which goes into the spool, is locally distributed, hash distributed, or duplicated on all the available processors. The relation may also be cached or not cached. Furthermore, the relation may be sorted or unsorted.

Another parameter type for the query execution plan may indicate a confidence factor for a join operation such as high confidence, low confidence, or even no confidence.

Still other parameter types may identity the system configuration information for the query execution plan and other environmental parameters like the number of processing nodes, number of processors, disk arrays, etc. These latter configuration and environmental factors may consciously not be considered when a client is updated to better hardware environments or with upgraded databases.

To compare multiple query execution plans, a weighted value for each plan is determined. The total score (weighted number) is obtained by computing the weights for individual steps of each query execution plan and then summing each of the steps. This is discussed in greater detail with reference to the FIG. 2 and the method 200 below. For steps that are executed in parallel (step that is broken into a plurality of sub steps and then performed in parallel on different processors) the weight is the maximum of the weights of the parallel steps.

For computation of the weights for the steps, each step kind (operation type in the query execution plan) and other parameter types being considered for computation are assigned specific weights. The weight assignment is furnished below.

Weight Assignments for Step Kind (Operation Type or Kind)

Let the array of weights for step kind be Stepkind_wt[ ];
AB = 99999; //Abort step. Aborting is rolling back and redoing. Hence a query having abort can be eliminated from comparison.
However the other query plan may be alright. And the user may like to consider it. Hence a large weight is assigned to the query plan which is aborted. The user may have to eliminate this from comparison.
CE = 10; //Correlated inclusion merge join step.     i.e. stepkind_wt[CE] = 1;
CJ = 20; //Correlated inclusion product join step.
CP = 10; //Correlated exclusion merge join step.
CI = 20; //Correlated exclusion product join step.
EM = 1; //Exclusion merge join step.
EP = 2; //Exclusion production join step.
RJ = 0.5; //Rowid join step.
NJ = 1; //Nested join step
HJ = 2; //Hash join step.
MJ = 3; //Merge join step.
PJ = 4; //Product join step
IM = 1; //Inclusion merge join step
IP = 2; //Inclusion product join step.
EJ =1; //Exists join step.

-continued

OJ = 1; //Not exists join step.
MI = 1; //Minus all join step.
IJ = 1; //Intersect all join step.
HS = 50; //Hash star join step.
Note: The following steps may not be considered to achieve the plan weight when step kind does not vary for same plan in two different database/optimizer versions. Lock Steps can be ignored during plan compares.
DE Delete step.
UP Update step.
// Merge related steps are differentiated by taking step attribute and its value
MD Merge delete step.
MG Merge step.
MU Merge update step.
BM Bitmap step.
LK Lock step. // can be ignored
MS Other step. This code describes any type of step not described by the other StepKind codes.
IN Insert step.
MT Materialize temporary table step.
FD Flush database step.
SA Sample step.
SO Sort step.
SP Spoil step.
SR Single retrieve step.
ST Statistics step.
SU Sum retrieve step.
© NCR, Corp. 2007

Weight Assignments for Data Access Module Processor (AMP) Usage

Have an array of weights for all amps, group amp, two amp, one amp. Let it AMPUsage_wt[ ];
Weights for AMP Usage;
    A (All Amp) = 4;    // AMPUsage_wt[A] = 4;
    G (Group Amp) = 3;    // AMPUsage_wt[G] = 3;
    T (Two Amp) = 2;    // AMPUsage_wt[T] = 2;
    O (Single Amp) = 1;    // AMPUsage_wt[O] = 1;
        © NCR, Corp. 2007

Weight Assignments for Confidence Levels

Let the array be confidence_wt[ ];
    H = 1; //High Confidence
    I = 2; //Index Confidence
    L = 3; // Low confidence
    N = 4; // No confidence
        © NCR, Corp. 2007

Weight Assignments for Distribution

Let the array be geoginfo_wt[ ];
    L = 1; // Local distribution;
    H = 2; // Hash distribution;
    D = 3; // Duplicated;
        © NCR, Corp. 2007

Weight Assignments for Sorted/Unsorted unsortedwt = 0.1;
© NCR, Corp. 2007

Weight Assignments for Cached/Uncached uncachedwt = 5.0;
© NCR, Corp. 2007

Merge Mode Step Attribute Value

Merge update and delete operation are differentiated by the type of merging mode. Hence the following weights are assigned for the different modes.
Float Get_mergemodewt(char attrib_value)
    {
        If (attrib_value == 'H') return (0.1); //Match on Row Hash
        If (attrib_value == 'R') return (0.2); // Match on Row ID
        If (attrib_value == 'W') return (1.0); // Match on Whole row
}
© NCR, Corp. 2007

Access Weight Based on Index

Weights for the type of access are given here.
Get_access_wt (char accessinfo)
{
    if (accessinfo = = 'C') return (1.0); // The secondary index is a covering index;
    If (accessinfo = = 'B') return (2.0); // Bit Map indexing
    If (accessinfo = = 'N') return (5.0); // Neither of them, hence a FTS
}
© NCR, Corp. 2007

Computation of Plan Weight

The plan weight is the step weight computation is given here as a function, which is self explanatory. It is proposed to have two structures for the two plans being compared. The plan structures contain all the parameters referred for comparison. The two plans generated by two database versions are compared step by step. Weight is added to a step, only if the parameters being considered in the step are different in the two plans.
© NCR, Corp, 2007

Example Algorithm to Compute a Step Weight of a Query Execution Plan

Compute_step_weight (plan1, plan2);
// plan1 and plan2 structures are passed with all the attributes mentioned in the algorithm.
// the respective computed weights are returned in the structure. Plan1 and plan2 may be
// passed by address.
{
plan1.tempwt = plan2.tempwt = 0;
If plan1.
If plan1.stepkind <> plan2.stepkind    // step kind is the operation ID
    {
      plan1.tempwt += stepkind_wt[plan1.stepkind];
      plan2.tempwt += stepkind_wt[plan2.stepkind];
    }
    If plan1.AMPUsage <> plan2.AMPUsage
    {
      plan1.tempwt += AMPUsage_wt[plan1.ampuse];
      plan2.tempwt += AMPUsage_wt[plan2.ampuse];
    }
    If (plan1.source.index.accessinfo <> plan2.source.index.accessinfo)

```
            {
                plan1.tempwt +=
get_access_wt(plan1.source.index.accessinfo);
                plan2.tempwt +=
get_access_wt(plan2.source.index.accessinfo);
            }
        If ((plan1.target.bsorted) XOR (plan2.target.bsorted))
            If plan1.target.bsorted plan2.tempwt += unsortedwt;
                Else        plan1.tempwt += unsortedwt;
        If ((plan1.target.bcached) XOR (plan2.target.bcached))
            If plan1.target.bcached   plan2.tempwt += uncachedwt;
                Else        plan1.tempwt += uncachedwt;
        If plan1.target.confidence_level <>
plan2.target.confidence_level
                {plan1.tempwt +=
confidence_wt[plan1.target.conficence_level];
                plan2.tempwt +=
confidence_wt[plan2.target.confidence_level];
                }
            If plan1.target.geoginfo <> plan2.target.geoginfo
                {plan1.tempwt +=
                geoginfo_wt[plan1.target.geoginfo];
                plan2.tempwt +=
                geoginfo_wt[plan2.target.geoginfo];
                }
        // for considering the estimated rows that are put into spool,
logarithm of the spool
        // size is a weight factor.
            If (plan1.target.size <> plan2.target.size)
                {plan1.tempwt += log(plan1.target.size); //logarithm to
base 10;
                plan2.tempwt += log(plan2.target.size);
                }
            If (plan1.cost <> plan2.cost)    //cost is a string variable in
COperationInfo in VEC
                                // and float in QCD table query
steps
                {plan1.tempwt += plan1.cost;
                plan2.tempwt += plan2.cost;
                }
            If (plan1.stepattributetype = = mergemode) and
                (plan2.stepattributetype = = mergemode) then
                If (plan1.stepattributevalue <> plan2.stepattributevalue)
                    {plan1.tempwt +=
get_mergemodewt(plan1.stepattributevalue);
                    plan2.tempwt +=
get_mergemodewt(plan2.stepattributevalue);
                    }
        // if there is partition specified on a table, the number of partitions
being used are considered
        // as weight factor.
                If (plan1.stepattributetype = = partcount) and
                (plan2.stepattributetype = = partcount) then
                    If (plan1.stepattributevalue <> plan2.stepattribute value)
                        {plan1.tempwt += partitionwt[plan1.stepattributevalue];
                                    //may be →
atoi(plan1.stepattributevalue);
                        plan2.tempwt += partitionwt[plan2.stepattributevalue];
                        }
}
© NCR, Corp, 2007
```

Example Algorithm to Compute the Weights for Two Optimizer Plans

```
Initialize:
    Plan1.wt = Plan2.wt = 0.0;
For every step
{
    If parallel steps exist, then
    {
        plan1.parallelwt = plan2.parallelwt = –99999; // negative infinity;
        For every parallel step
        {
            Compute_step_weight (plan1, plan2);
            // get maximum stepwt from all the parallel steps as the
```

```
parallel weight;
            If plan1.parallelwt < plan1.tempwt, then plan1.parallelwt =
plan1tempwt;
            If plan2.parallelwt < plan2.tempwt, then plan2.parallelwt =
plan2tempwt;
        }       // end of for every parallel step
        Plan1.wt += plan1.parallelwt;
        Plan2.wt += plan2.parallelwt;
    } // end of if parallel steps exist;
Compute_step_weight (plan1, plan2);
Plan1.wt += plan1.tempwt;
Plan2.wt += plan2.tempwt;
} // end of for every step;    weight computation is completed for a
query plan.
After running the above algorithm, plan1 and plan2 now contain the total
weight of the plan in the variable Plan1.wt and Plan2.wt.
© NCR, Corp, 2007
```

Reporting Top N Plans Having Significant Change

Plan1 and Plan2 of each query contain the total weight (relative to each other, as weight is added only if difference in some comparison parameters is noticed). To bring out the top N queries having significant difference, each query number (ID) and the weight difference between the plans are copied to a data structure. The data structure is sorted on the weight difference and the required number of queries and their plans are reported. In order to avoid huge memory requirement, only 1000 queries are taken at a time, sorted and N queries are temporarily stored in a separate structure. When all the query plans in terms of thousands' are exhausted, the temporarily stored query plans are again sorted and the required N query plans are reported.

The data structures and algorithms are furnished below.

Algorithm for Data Structure

```
Declare a simple data structure
    Typedef struct {
        Float   cost_diff;
        Int     queryID;
    } PLAN_CHANGE;
    PLAN_CHANGE plan_changes[1000]; //requires 6000 bytes ; at a
time 1000 queries
                                    are examined. From 1000, N are
brought out;
    PLAN_CHANGE results[100];    // may be required to enhance the
dimension
    Int queryindex = 0;
    Int n;              // required queries having significant
change
    Read n;             // user input;
    While the number of queries (plans) > 1000, then
    {
        For (i=0; i<1000; i++) {
            Plan_changes[i].cost_diff =
            ABS (plan1.wt[queryindex*1000+i] –
                                        plan2.wt[queryindex*1000+i]) ;
            Plan_changes[i].queryID = queryindex*1000+i;
        }
        Qsort (plan_changes, number of queries, ..,..);
        //Copy the first N queries with their IDs and cost differences into
results;
        For (j=0; j<n, j++) results[queryindex*n+j] = plan_changes[j];
        Number of queries –= 1000;
        Queryindex++;
    };
If number of queries > 0 then      // at this stage number of queries are <
1000;
    For (i=0; i<number of queries; i++) {
        Plan_changes[i].cost_diff = ABS(plan1.wt[queryindex*1000+i] –
                                    plan2.wt[queryindex*1000+i]);
        Plan_changes[i].queryID = queryindex*1000+i;
    }
```

-continued

```
    Qsort (plan_changes, number of queries, ..,..);
        //Copy the first N queries with their IDs and cost differences into
results;
        For (j=0; j<n, j++) results[queryindex*n+j] = plan_changes[j];
        Queryindex++;
// now top N queries from groups of 1000 queries are obtained. From this
list, sort out and obtain the actual top N queries.
Qsort (results, queryindex*n, .., ..);
Outputs the first N from results are most significant compare plans along
with their QueryID and cost differences.
© NCR, Corp. 2007
```

The top N value can be provided by a database administrator (DBA) before starting the Batch compare and it should be less than total number of plans that are to be compared.

Figure 2:
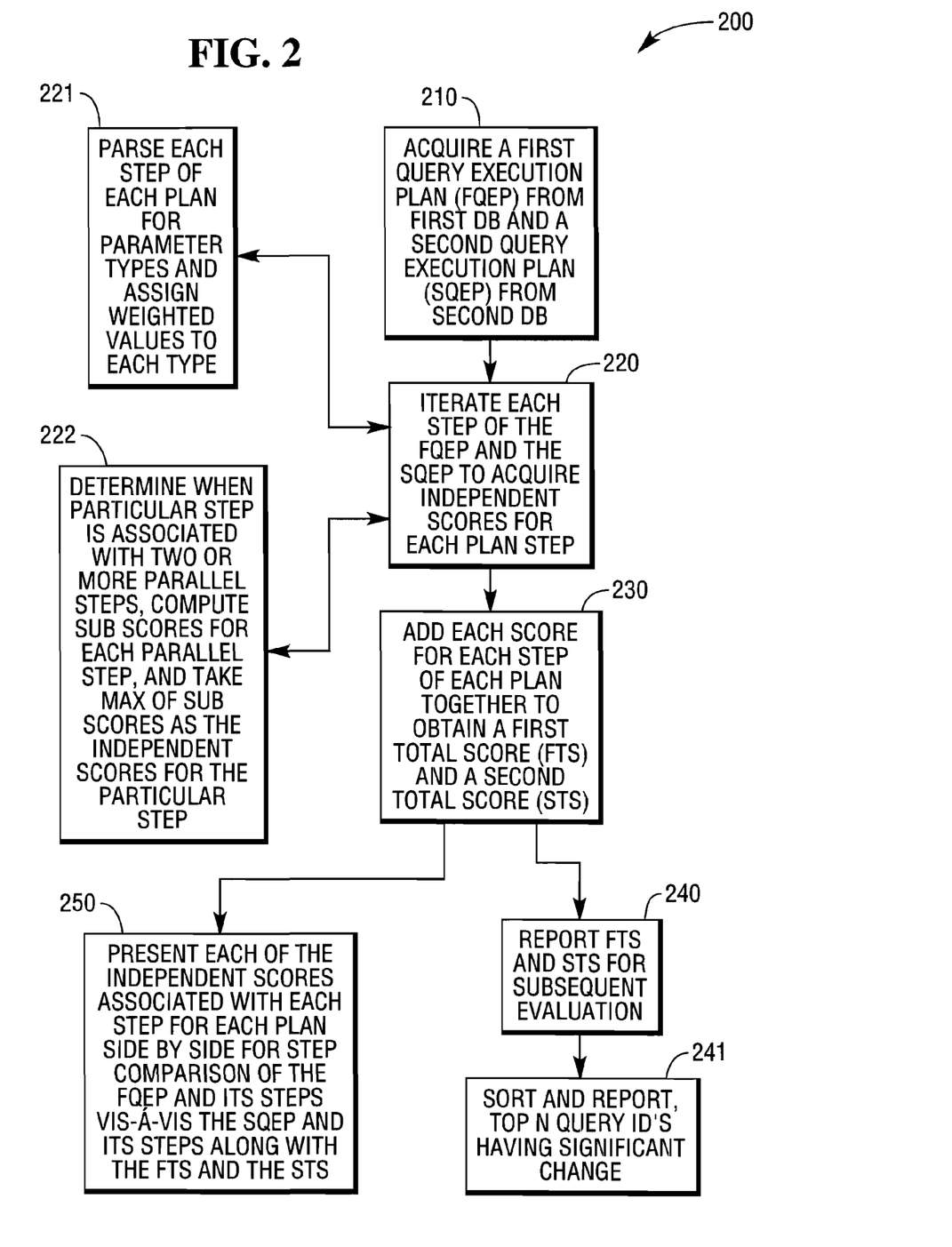
FIG. 2 is a diagram of a method for comparing query execution plans against two databases or two versions of database optimizers, according to an example embodiment.

More discussion of the scoring and comparing and step weighting is now presented with the discussion of the method 200 of the FIG. 2.

FIG. 2 is a diagram of a method 200 for comparing query execution plans against two databases or two versions of database optimizers, according to an example embodiment. The method 200 (hereinafter referred to as "query step and plan scoring and comparing service") is implemented in a machine-accessible and readable medium as instructions that when executed by a machine performs the processing depicted in FIG. 2. Moreover, the query step and plan scoring and comparing service is operational over a network, which may be wired, wireless, or a combination of wired and wireless.

The query step and plan scoring and comparing service presents an enhanced and more detailed perspective of a query execution plan scoring and comparing than what was presented with the method 100 of the FIG. 1. Specifically, the query step and plan scoring and comparing service provides a scoring technique that is done on a per-step bases of a query execution plan and specifically evaluates two query execution plans at a time against one another. The details of this enhanced processing is discussed more completely below.

At 210, the query step and plan scoring and comparing service acquires a first query execution plan from a first database optimizer (or first version of a database optimizer) and a second query execution plan from a second database optimizer (or second version from the same database optimizer). In an embodiment, the two query execution plans are for the same search query that is to be executed against a database but each query execution plan was produced by a different database optimizer or by different versions of the same database optimizer.

At 220, the query step and plan scoring and comparing service iterates each execution step in both the first query execution plan from the first database optimizer and the second query execution plan from the second database optimizer for purposes of ultimately acquiring independent scores for each plan step of each query execution plan. An example, algorithm for doing this was presented above with reference to the method 100 of the FIG. 1 and was identified as the "Algorithm to Compute Weights for Two Optimizer Plans." Essentially, each plan is parsed on a step by step basis an each set of parsed steps for the two plans are passed to a step weighting service. An algorithm for this step weighting was also presented above with respect to the method 100 of the FIG. 1 and identified as the "Algorithm to Compute Step Weight for a Query Execution Plan."

At 221, query step and plan scoring and comparing service to compute step weights parses each step of each plan for parameter types. When the parameter types are identified, a predefined weight associated with that identified parameter type is assigned as a weighted value. The example parameter types and predefined weighted values were also defined and presented above with reference to the method 100 of the FIG. 1.

At 222, the query step and plan scoring and comparing service may also determine that a particular step of a particular plan includes parallel sub steps. In other words, a step is processed in parallel. In such a case, the query step and plan scoring and comparing service can compute sub scores for each parallel step and then the maximum of the sub scores is taken as the independent score for the particular step that is associated with parallel steps.

At 230, the query step and plan scoring and comparing service adds each score for each step of each plan together to obtain a first total score for the first query execution plan and a second total score for the second query execution plan. At this point, the total scores can be compared to determine a more optimal plan and in some cases, the individual steps can be viewed to identify more optimal steps or problem steps within each plan.

According to an embodiment, at 240, the query step and plan scoring and comparing service reports the first total score and the second total score for subsequent evaluation. At 241, the total scores and query identifiers associated with the total scores may be sorted with other scores and other query identifiers in a data structure and the top N query identifiers reported out when a significant difference between totals scores are detected.

In another situation, at 250, the query step and plan scoring and comparing service presents each independent score for each step of each plan side-by-side for step comparison (mentioned above at 230). This permits the individual steps of the first query execution plan to be visual compared in a more comprehendible manner with the individual steps of the second query execution plan. The total scores for each of the query execution plans may also be viewed with their individual step scores.

Figure 3:
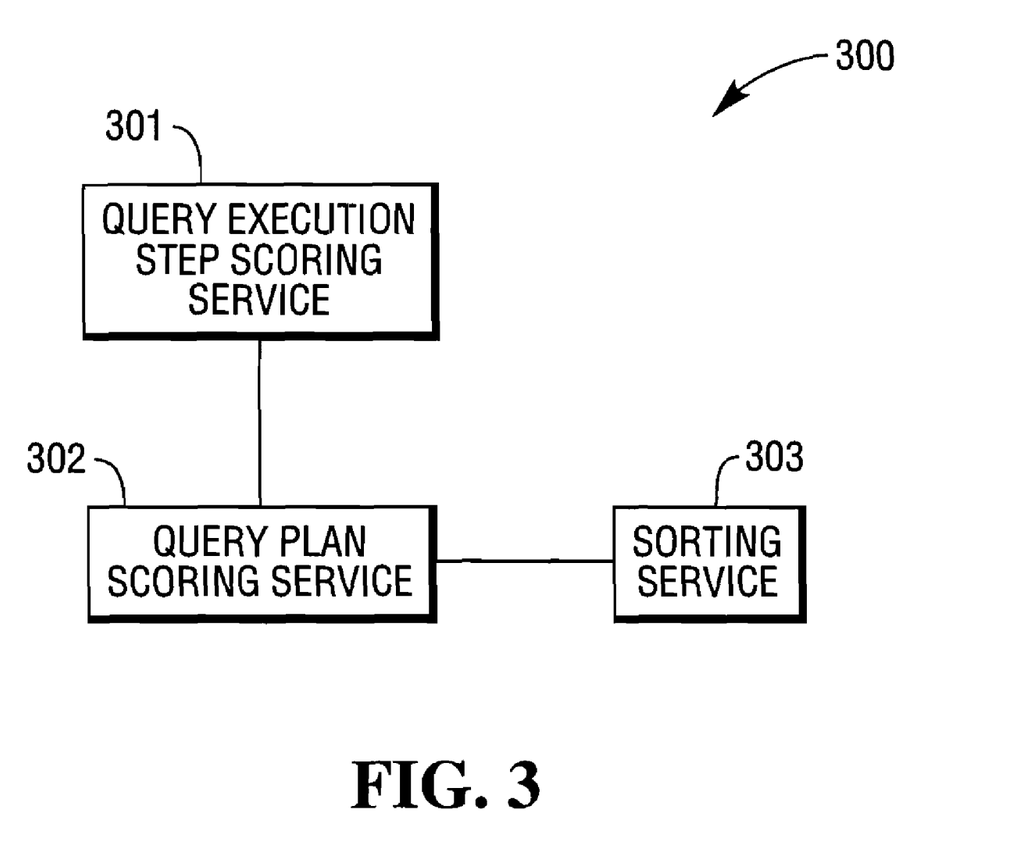
FIG. 3 is a diagram of a query scoring and comparison system, according to an example embodiment.

FIG. 3 is a diagram of a query scoring and comparison system 300, according to an example embodiment. The query scoring and comparison system 300 is implemented in a machine-accessible and readable medium as instructions that when executed by a machine performs a variety of processing, such as the processing discussed in detail above with reference to the methods 100 and 200 of the FIGS. 1 and 2.

The query scoring and comparison system 300 includes a query execution step scoring service 301 and a query plan scoring service 302. In an embodiment, the query scoring and comparison system 300 also includes a sorting service 303. Each of these and their interactions with one another will now be discussed in detail.

The query execution step scoring service 301 is implemented in a machine-accessible and readable medium as instructions that process on a machine. The query execution step scoring service 301 is to supply a step score for each step or a query execution plan. Each step is supplied by the query plan scoring service 302.

The query execution step scoring service 301 parses each step for predefined parameter types and assigns predefined weighted values for each identified parameter type when producing the step scores for a particular step of a particular query execution plan.

Example processing associated with the query execution step scoring service 301 was presented in detail above with reference to the method 200 of the FIG. 2. Moreover, an example algorithm for implementing the query execution step scoring service 301 was presented above with reference to the method 100 of the FIG. 1.

The query plan scoring service 302 is implemented in a machine-accessible and readable medium as instructions that process on a machine. The query plan scoring service 302 decomposes query execution plans into independent processing steps and passes each step to the query execution step scoring service 301. As mentioned above, the query execution step scoring service 301 returns a step score or weighted value for that step. The query plan scoring service 302 adds the independent scores for each step (step scores) together for a particular plan to produce a total score or total weighted value for that particular plan. This is done for each of the plans being scored and compared against one another vis-à-vis their assigned scores.

The query plan scoring service 302 may also determine when a particular step of a particular plan is associated with a plurality of parallel steps and is to call the query execution step scoring service 301 for each parallel step. The step scores received back are then added together to obtain an overall step score for that step having the parallel steps.

Example processing associated with the query plan scoring service 302 was described in detail above with reference to the methods 100 and 200 of the FIGS. 1 and 2, respectively. Moreover, an example algorithm that implements the query plan scoring service 302 was presented above with reference to the method 100 of the FIG. 1.

In an embodiment, the query scoring and comparison system 300 also includes a sorting service 303. The sorting service 303 is implemented in a machine-accessible and readable medium as instructions that process on a machine. The sorting service 303 sorts each query execution plan and its score in a data structure in response to the values associated with the scores. An example data structure and algorithm that implements such a sorting service 303 was presented in detail above with reference to the method 100 of the FIG. 1.

In some situations, the sorting service 303 automatically and dynamically reports a top configurable number of query execution plans and their total scores from the sorted data structure to an administrator for subsequent evaluation. The top configurable number can in some cases be supplied as a processing parameter to the sorting service 303 by the administrator.

One now appreciates how query execution plans can be efficiently and automatically compared and scored for purposes of readily determining more optimal query execution plans or problem steps within a query execution plan. The query execution plans can be associated with a same database query but associated with different database optimizers or different versions of a same database optimizer.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
    acquiring predefined parameter types for comparing multiple query execution plans against one another, each query execution plan including a number of parameters associated with the parameter types, each parameter identified and acquired for comparison from each query execution plan and each query execution plan developed by a different database optimizer;
    assigning predefined weights to each of the parameters that are identified within each of the query execution plans, the weights assigned based on the parameter type for each parameter;
    computing a total score for each of the query execution plans in response to the weights associated with each query execution plan to select a particular query execution plan for a particular database optimizer.

2. The method of claim 1 further comprising:
    populating a data structure with query identifiers for each query execution plan and score differences associated with differences between the total scores for each query execution plan, wherein each entry in the data structure includes a single query identifier along with its corresponding score difference; and
    sorting the entries within the data structure in response to the score differences.

3. The method of claim 2 further comprising, reporting a configurable number of the query identifiers and their score differences to an administrator.

4. The method of claim 1, wherein acquiring further includes accessing a database to acquire the parameter types.

5. The method of claim 4, wherein assigning further includes acquiring values that represent each of the weights.

6. The method of claim 1, wherein computing further includes summing the weights associated with each query execution plan together to produce the total score for that particular query execution plan.

7. A machine-implemented method, comprising:
    acquiring a first query execution plan and a second query execution plan, the first query execution plan developed from a first database optimizer and the second query execution plan developed by a second database optimizer, the first and second database optimizers are different versions of a same database optimizer;
    iterating each step of the first query execution plan and the second query execution plan to acquire independent scores for each step of each plan, the scores weighted based on parameter type for parameters associated with each query execution plan; and
    adding each score for each step of each plan together to obtain a first total score for the first query execution plan and a second total score for the second query execution plan.

8. The method of claim 7, wherein iterating further includes:
    determining when a particular step is associated with two or more parallel steps;
    computing sub scores for each of the two or more parallel steps; and
    taking a maximum of the sub scores as the independent scores for the particular step.

9. The method of claim 7 further comprising, reporting the first total score and the second total score for subsequent evaluation.

10. The method of claim 7 further comprising, presenting each of the independent scores associated with each step for each plan side by side for step comparison of the first query execution plan and its steps vis-à-vis the second query execution plan and its steps along with the first and second total scores.

11. The method of claim 7, wherein acquiring further includes recognizing the first query execution plan and the second query execution plan as being associated with a same query job that each of the first and second database optimizers produce different query execution plans for.

12. A machine-implemented system comprising:
 a query execution step scoring service implemented in a machine-accessible medium and to process on a machine; and
 a query plan scoring service implemented in a machine-accessible medium and to process on the machine, the query plan scoring service is to decompose query execution plans into independent processing steps and pass each step to the query execution step scoring service, each query execution plan developed by a different database optimizer, and the query execution step scoring service is to supply a step score for each step provided by the query plan scoring service, each score a sum of weights based on particular parameter types assigned in each of the execution plans, and the query plan scoring service is to add the step scores for each query execution plan to acquire a total score for each query execution plan to select a particular query execution plan and a particular database optimizer.

13. The system of claim 12, wherein query plan scoring service is to determine when a particular step of a particular query execution plan includes parallel steps and is to call the query execution step scoring service for each parallel step and add each step score received together to obtain an overall step score for that particular step that has the parallel steps.

14. The system of claim 12 further comprising, a sorting service implemented in a machine-accessible medium and to process on the machine, wherein the sorting service is to sort each query execution plan and its total score in a data structure in response to values associated with the total scores.

15. The system of claim 12, wherein the sorting service is to automatically report a top configurable number of query execution plans and their total scores from the sorted data structure to an administrator for subsequent evaluation.

16. The system of claim 15, wherein the top configurable number is supplied as a processing parameter from the administrator to the sorting service.

* * * * *